US012592457B2

(12) United States Patent (10) Patent No.: US 12,592,457 B2
Yamada et al. (45) Date of Patent: Mar. 31, 2026

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi (JP)

(72) Inventors: Yuhei Yamada, Osaka (JP); Hideo Takahashi, Osaka (JP); Hideaki Nakajima, Osaka (JP); Yuki Ohira, Aichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 997 days.

(21) Appl. No.: 17/712,809

(22) Filed: Apr. 4, 2022

(65) Prior Publication Data

US 2022/0336929 A1 Oct. 20, 2022

(30) Foreign Application Priority Data

Apr. 19, 2021 (JP) ................................. 2021-070413

(51) Int. Cl.
*H01M 50/519* (2021.01)
*H01M 50/505* (2021.01)
(Continued)

(52) U.S. Cl.
CPC ....... *H01M 50/519* (2021.01); *H01M 50/505* (2021.01); *H01M 50/543* (2021.01);
(Continued)

(58) Field of Classification Search
CPC ............. H01M 50/507; H01M 50/519; H01M 50/569; H01M 50/543; H01M 2220/20; H01M 50/505; H01R 13/72
See application file for complete search history.

(56) References Cited

U.S. PATENT DOCUMENTS 8,540,526 B2 * 9/2013 Mooney ................. H02G 5/007
439/213
2008/0078879 A1 4/2008 Weaver
(Continued)

FOREIGN PATENT DOCUMENTS

JP 2015-156329 A 8/2015
JP 2019-192336 10/2019

OTHER PUBLICATIONS

China Office Action and Search report received in CN Application No. 202210366935.6, dated Jul. 9, 2025, and English language translation thereof.

*Primary Examiner* — Michael L Dignan
(74) *Attorney, Agent, or Firm* — Greenblum & Bernstein, P.L.C.

(57) ABSTRACT

A wiring module that is to be mounted on power storage elements having electrode terminals includes a flexible board to be electrically connected to the electrode terminals, a connector connected to the flexible board, and a casing holding the flexible board and the connector. The casing includes a case body to be fixed to the power storage elements, a connector holder holding the connector, and a connection portion that is expandable and retractable and connects the connector holder and the case body such that the connector holder is movable relative to the case body. The flexible board includes a board body section fixed to the case body, and an extra section extending from the board body section and having an end that is connected to the
(Continued)

connector. The extra section moves according to expansion and retraction of the connection portion.

19 Claims, 10 Drawing Sheets

(51) Int. Cl.
  *H01M 50/543* (2021.01)
  *H01R 13/516* (2006.01)
  *H01R 13/72* (2006.01)

(52) U.S. Cl.
  CPC ........... *H01R 13/516* (2013.01); *H01R 13/72* (2013.01); *H01M 2220/20* (2013.01)

(56) References Cited

U.S. PATENT DOCUMENTS

| | | | |
|---|---|---|---|
| 2011/0104556 A1* | 5/2011 | Kim ................... | H01M 50/522 |
| | | | 174/68.2 |
| 2012/0328920 A1* | 12/2012 | Takase ................ | H01M 50/503 |
| | | | 429/158 |
| 2014/0041212 A1* | 2/2014 | Penumatcha ......... | H01R 43/26 |
| | | | 29/748 |
| 2020/0022260 A1* | 1/2020 | Takamatsu .......... | H01M 50/519 |
| 2021/0098848 A1 | 4/2021 | Takase et al. | |
| 2024/0106079 A1* | 3/2024 | An ..................... | H01M 50/507 |

* cited by examiner

WIRING MODULE

TECHNICAL FIELD

The present disclosure relates to a wiring module.

BACKGROUND ART

An example of a wiring module to be mounted on power storage elements is disclosed in Japanese Unexamined Patent Application Publication No. 2015-156329. The wiring module includes a voltage monitoring line that is connected to the electrode post of the power storage element. The voltage monitoring line is composed of a flexible connection line such as a flexible flat cable (FFC) or a flexible print circuit board (FPC). A connection connector is connected to one end of the voltage monitoring line. The connection connector is connected to a unit-side connector of a voltage monitoring unit.

RELATED ART DOCUMENT

Patent Document

[Patent Document 1] Japanese Unexamined Patent Application Publication No. 2015-156329

SUMMARY OF THE INVENTION

Problem to be Solved by the Invention

The connection connector is coupled to the unit-side connector of the voltage monitoring unit as follows. The power storage elements connected together with the wiring module are fixed in a certain position and the unit-side connector is fixed in a certain position. The connection connector is moved closer to be opposite the unit-side connector and fitted to the unit-side connector. Thus, the connection connector and the unit-side connector are coupled together.

To perform the above coupling operation, the voltage monitoring line necessarily includes an extra section. The extra section includes a section having a length required for moving the connection connector closer to be opposite the unit-side connector and a section having a length required for pushing and fitting the connection connector to the unit-side connector. The extra section necessarily moves to follow the movement of the connection connector during the coupling operation of the connection connector and the unit-side connector.

However, in the above configuration including the extra section that can always move freely, the extra section may receive stress if the connection connector moves due to vibration. For example, vibration occurs when the wiring module is transported before the coupling of the connection connector and the unit-side connector or when a vehicle moves after the connection connector and the unit-side connector are coupled together and installed in the vehicle. Due to such vibration, the connection connector moves and stress may be applied to the extra section.

An external force may be applied to the extra section by an operator. For example, when the connection connector and the unit-side connector are coupled together, the operator may pull the connection connector too much and a stress may be applied to the extra section.

Means for Solving the Problem

A wiring module described herein is a wiring module to be mounted on power storage elements having electrode terminals. The wiring module includes a flexible board to be electrically connected to the electrode terminals, a connector connected to the flexible board, and a casing holding the flexible board and the connector. The casing includes a case body to be fixed to the power storage elements, a connector holder holding the connector, and a connection portion that is expandable and retractable and connects the connector holder and the case body such that the connector holder is movable relative to the case body. The flexible board includes a board body section fixed to the case body and an extra section extending from the board body section and having an end that is connected to the connector. The extra section moves according to expansion and retraction of the connection portion and is longer than the connection portion. The extra section is loosened when the connection portion is expanded to be longest.

Advantageous Effects of Invention

According to the present disclosure, a wiring module in which a stress is less likely to be applied to a flexible board that is connected to a connector is provided.

MODES FOR CARRYING OUT THE INVENTION

Figure 1:
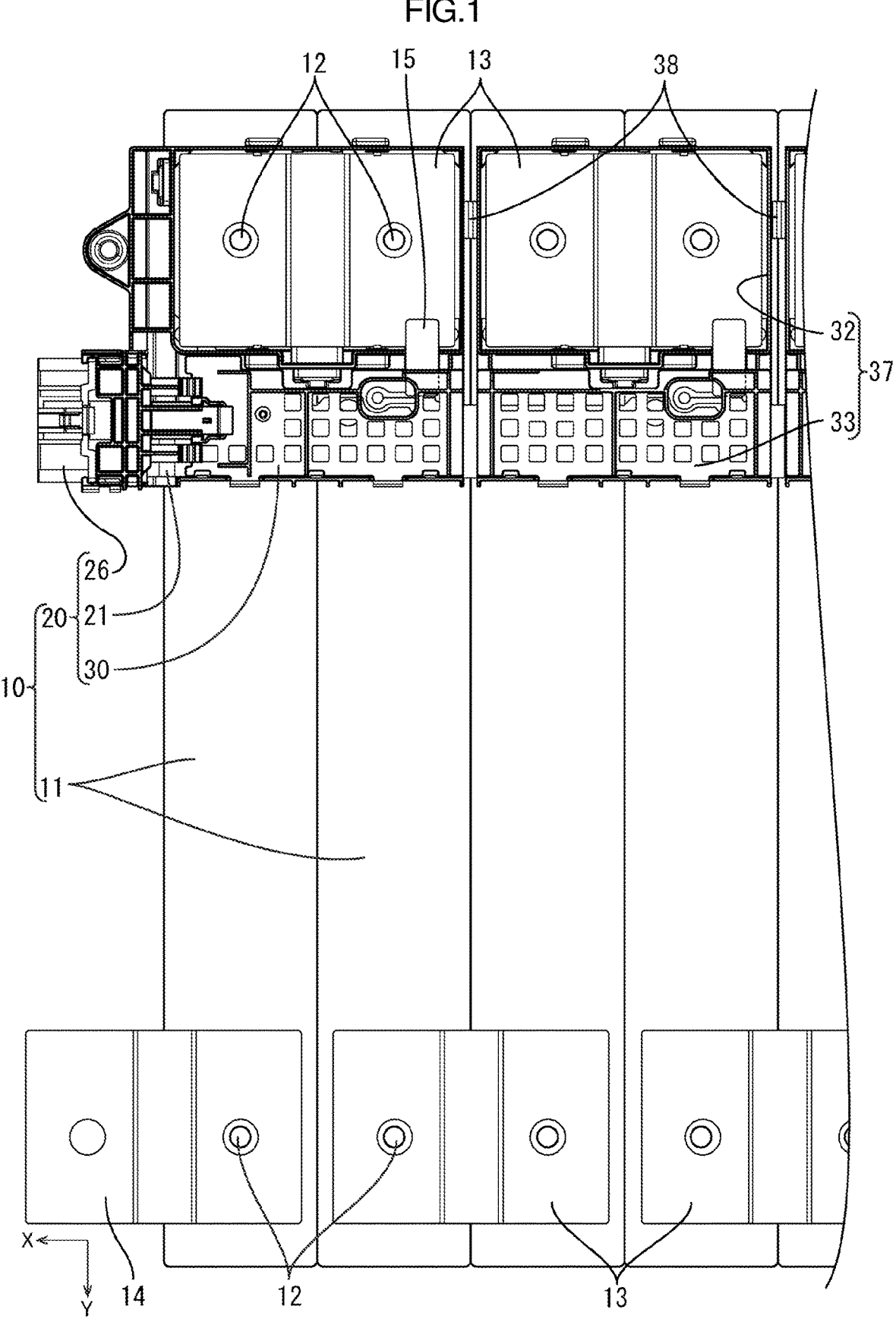
FIG. 1 is a plan view illustrating a portion of a power storage module according to one embodiment.

Description of Embodiments According to the Present Disclosure

First, embodiments according to the present disclosure will be listed and described.

(1) A wiring module according to the present disclosure is a wiring module to be mounted on power storage elements having electrode terminals. The wiring module includes a flexible board to be electrically connected to the electrode terminals, a connector connected to the flexible board, and a casing holding the flexible board and the connector. The casing includes a case body to be fixed to the power storage elements, a connector holder holding the connector, and a connection portion that is expandable and retractable and connects the connector holder and the case body such that the connector holder is movable relative to the case body. The flexible board includes a board body section fixed to the case body and an extra section extending from the board body section and having an end that is connected to the connector. The extra section moves according to expansion and retraction of the connection portion and is longer than the connection portion. The extra section is loosened when the connection portion is expanded to be longest.

According to such a configuration, the extra section is loosened when the connection portion is expanded to be longest. Therefore, a stress is less likely to be applied to the extra section.

(2) The connection portion may include hinges.

According to such a configuration, the connection portion can be expanded and retracted in a smooth manner.

(3) The connector holder may include a stopper receiving portion with which the connector is fixed relative to the case body and the case body may include a stopper portion that is fitted to the stopper receiving portion.

According to such a configuration, the connector can be fixed to the case body when the wiring module is transported.

(4) The casing may include a guide that restricts a direction in which the connector holder moves according to the expansion and retraction of the connection portion.

According to such a configuration, the coupling operation of the connector can be performed easily.

(5) The flexible board and the electrode terminals may be electrically connected via a bus bar.

According to such a configuration, the flexible board and the electrode terminals are electrically connected easily.

Detail of Embodiment According to the Present Disclosure

An embodiment according to the present disclosure will be described. The present disclosure is not limited to the embodiments. All modifications within and equivalent to the technical scope of the claimed invention may be included in the technical scope of the present invention.

Embodiment

One embodiment will be described with reference to FIGS. 1 to 10. A power storage module 10 according to this embodiment includes a wiring module 20 and is installed in a vehicle as a power source for driving the vehicle such as an electric automobile or a hybrid automobile. In the following description, it is considered that an Z arrow, an X arrow, and a Y arrow point the upper side, the front side, and the left side, respectively. Regarding components having the same configuration, some of the components may be indicated by reference signs and others may not be indicated by the reference signs.

[Power Storage Element]

As illustrated in FIG. 1, power storage elements 11 are arranged in the front-rear direction in the power storage module 10 (rear sections of the power storage elements 11 are not illustrated). The power storage element 11 has a rectangular plan view shape. The power storage element 11 includes a power storage mechanism therein. The type of power storage elements 11 is not particularly limited and may be a secondary battery or a capacitor. The power storage element 11 of this embodiment is a secondary battery.

[Electrode Terminal]

As illustrated in FIG. 1, the power storage element 11 includes two electrode terminals 12 on right and left end sections of an upper surface of the power storage element 11, respectively. One of the two electrode terminals 12 is an anode terminal and another one is a cathode terminal. In the power storage elements 11, two rows of electrode terminals 12 extend in the front-rear direction and are away from each other in the right-left direction. The electrode terminals 12 included in the right row are electrically connected to connection bus bars 13 (one example of a bus bar). The electrode terminals 12 included in the left row are electrically connected to the connection bus bars 13 or output bus bars 14 (one example of the bus bar).

[Connection Bus Bar, Output Bus Bar]

The connection bus bars 13 and the output bus bars 14 are formed by pressing metal plates into a predefined shape. Metal of which the metal plates are made may be selected from any kinds of metal including copper, copper alloy, aluminum, and aluminum alloy where appropriate. Surfaces of the connection bus bars 13 and the output bus bars 14 may be plated (not illustrated). The plating metal may be selected from any kinds of metal such as tin, nickel, and solder where appropriate.

As illustrated in FIG. 1, the connection bus bar extends between the electrode terminals 12 that are adjacent to each other in the front-rear direction and is connected to the adjacent electrode terminals 12. The output bus bar 14 is connected to one of the electrode terminals 12 for outputting power to external devices. This embodiment includes two output bus bars 14. One of the two output bus bars 14 is connected to a left electrode terminal 12 of a front-end one of the power storage elements 11 and another one of the two output bus bars 14 is connected to a left electrode terminal 12 of a rear-end one of the power storage elements 11 (only the output bus bar 14 connected to the front end one of the power storage elements 11 is illustrated in FIG. 1). The electric connection between the electrode terminals 12 and each of the output bus bar 14 and the connection bus bars 13 is established with known methods such as soldering, welding, and bolt-screwing.

As illustrated in FIG. 1, the connection bus bars 13 are electrically connected to a flexible board 21 of the wiring module 20. In this embodiment, the connection bus bars 13 are connected to the flexible board 21 with metal plates 15 made of nickel. The connection bus bars 13 are connected to the metal plates 15, respectively, with welding and the metal plates 15 and the flexible board 21 are connected with soldering. The output bus bars 14 are connected to the flexible board 21 similarly to the connection bus bars 13.

[Wiring Module]

As illustrated in FIG. 1, the wiring module 20 is disposed on upper surfaces of the power storage elements 11. The wiring module 20 of this embodiment includes the flexible board 21, a connector 26 connected to the flexible board 21, and a casing 30 that holds the flexible board 21 and the connector 26. The power storage module 10 includes the wiring module 20 (refer to FIG. 1) that is connected to the electrode terminals 12 on the right side of the power storage elements 11 and a wiring module (not illustrated) that is connected to the electrode terminals 12 on the left side of the power storage elements 11. The two wiring modules have a same configuration and only the former one will be described in detail in this specification.

[Flexible Board]

Figure 7:
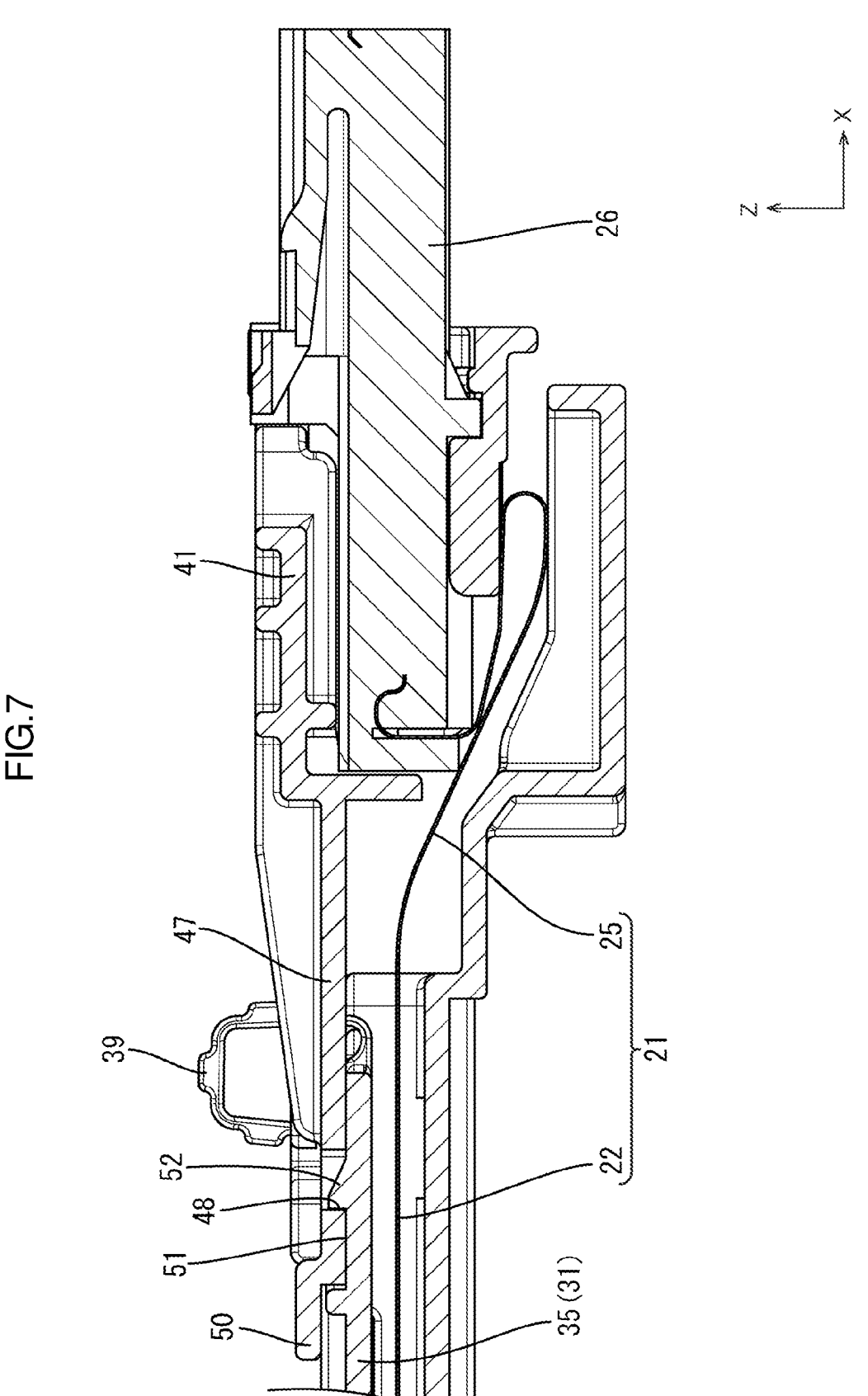
FIG. 7 is a cross-sectional view taken along D-D line in FIG. 2.

As illustrated in FIG. 1, the flexible board 21 has a long belt-like shape extending in the front-rear direction as a whole. The flexible board 21 includes a flexible insulating sheet and voltage detection lines (not illustrated) that are mounted on the flexible insulating sheet with print wiring technology. The flexible board 21 of this embodiment is a flexible printed board. As illustrated in FIG. 7, the flexible board 21 includes a board body section 22 and an extra section 25 that is continuous from the board body section 22. The board body section 22 is fixed to a case body 31.

[Board Body Section]

Figure 2:
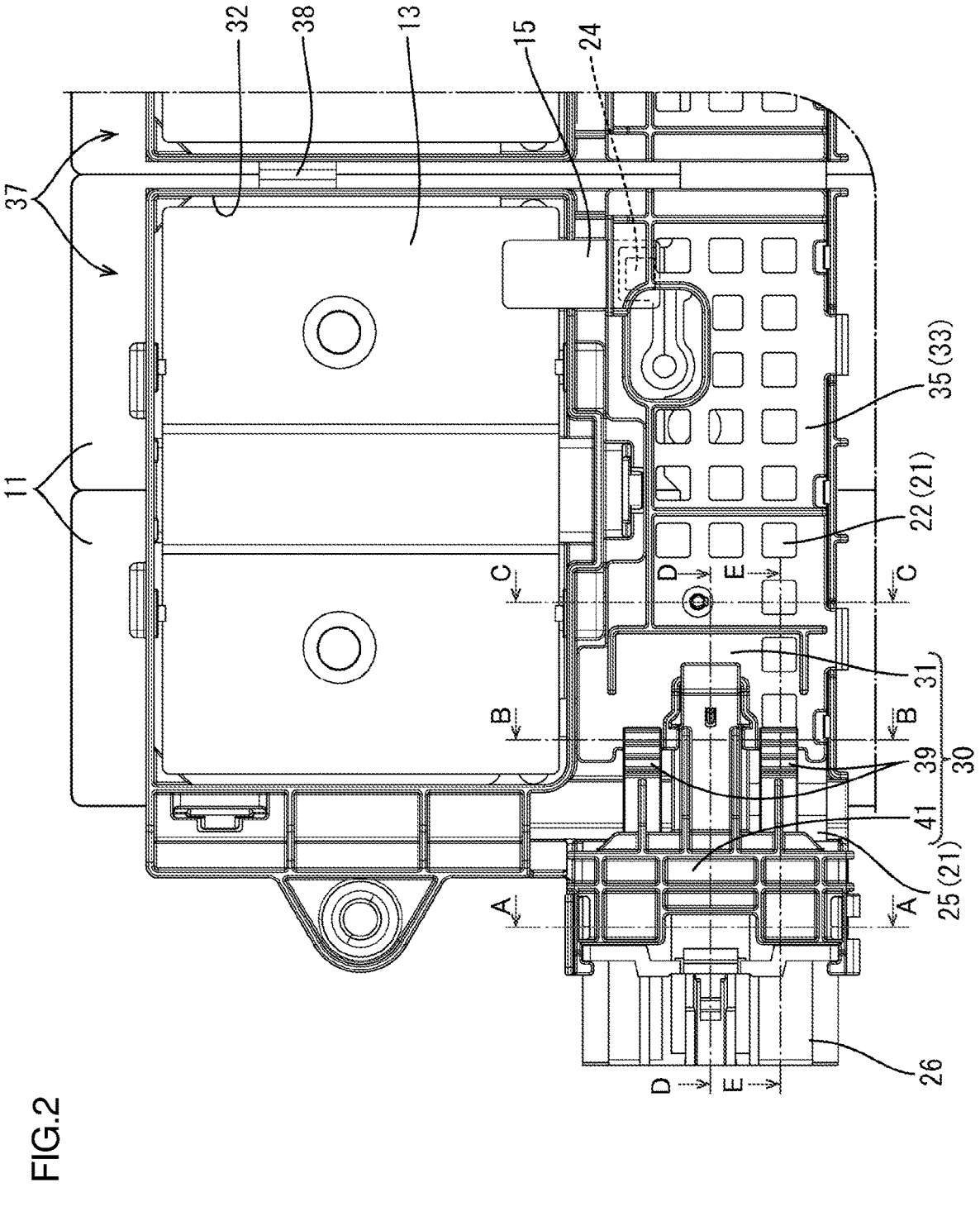
FIG. 2 is an enlarged plan view of the power storage module in which a connector holder is locked to a case body.
Figure 6:
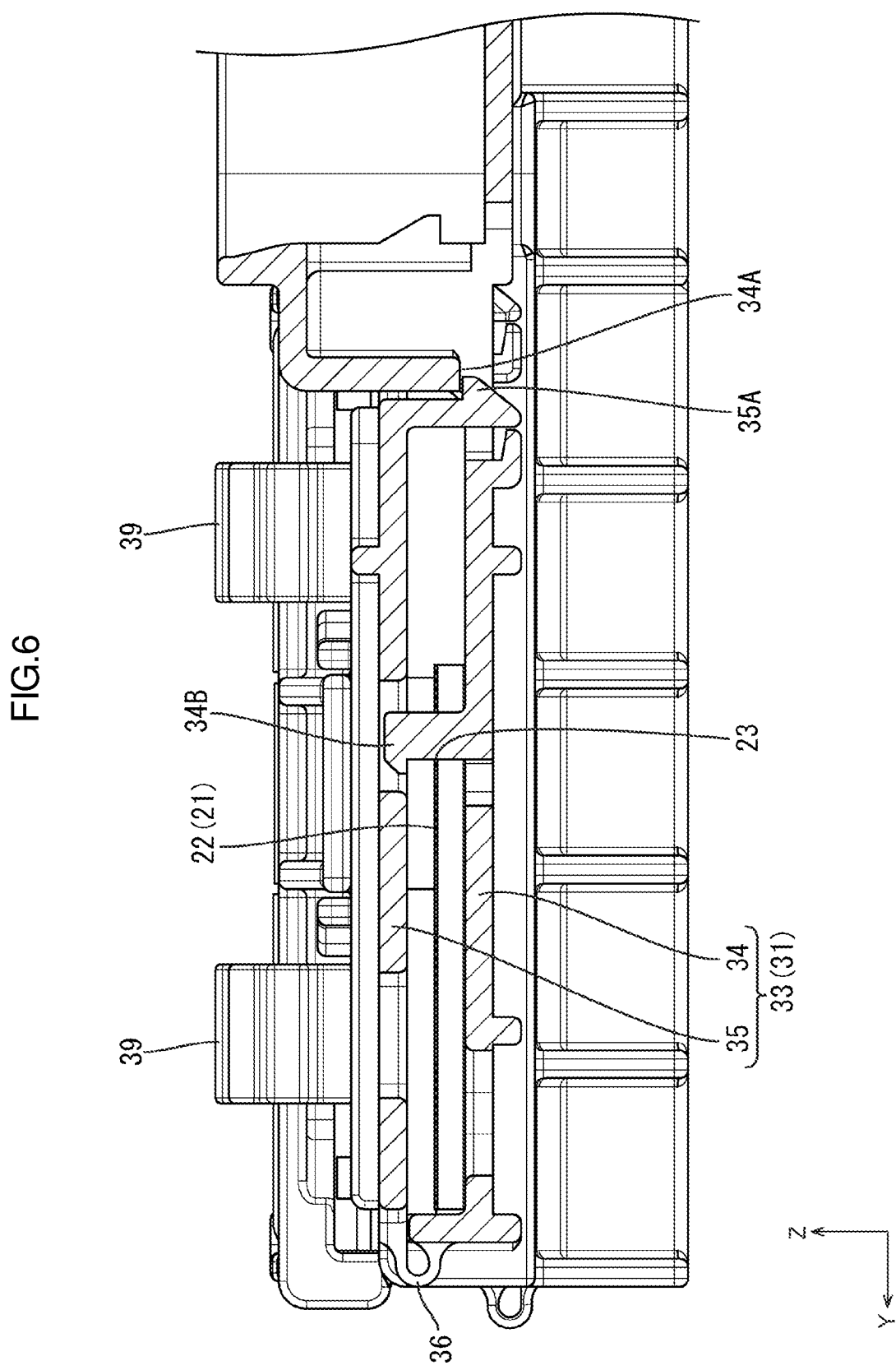
FIG. 6 is a cross-sectional view taken along C-C line in FIG. 2.

As illustrated in FIG. 6, the board body section 22 includes a through hole 23. A support post 34B of the case body 31 is inserted through the through hole 23. This positions and fixes the flexible board 21 relative to the case body 31. As illustrated in FIG. 2, the board body section 22 includes board-side connection portions 24 that project rightward. The board-side connection portions 24 are connected to the metal plates 15, respectively. One end of the voltage detection line, which is not illustrated, is mounted on the board-side connection portion 24.

[Extra Section, Connector]

As illustrated in FIG. 7, the extra section 25 is arranged in a front section of the case body 31 and is not fixed to the case body 31. That is, the extra section 25 is movable relative to the case body 31. The connector 26 for the flexible print board is connected to a front end of the extra section 25. The connector 26 includes a terminal, which is not illustrated, therein. The terminal is electrically connected to another end (not illustrated) of the voltage detection line on the flexible board 21.

Figure 10:
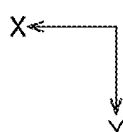
FIG. 10 is an illustrative plan view illustrating coupling of a connector and a unit-side connector.

As illustrated in FIG. 10, the connector 26 is to be connected to a unit-side connector 27 included in an ECU (electronic control unit) of an external device. The ECU includes a microcomputer and elements and has a known configuration configured to detect a voltage, a current, and a temperature of each power storage element 11 and control charging and discharging of each power storage element 11.

[Casing]

The casing 30 is made of insulating synthetic resin and has a plate shape. As illustrated in FIG. 2, the casing 30 includes the case body 31 that is fixed to the power storage elements 11, a connector holder 41 that holds the connector 26, and connection portions 39 that connect the case body 31 and the connector holder 41.

[Case Body]

As illustrated in FIG. 2, bus bar mount members 32 are disposed on the right side of the case body 31. The bus bar mount member 32 has a frame shape. The connection bus bar 13 is mounted on the bus bar mount member 32. The case body 31 includes a board holder 33 in a left section of the case body 31. The board holder 33 holds the board body section 22 of the flexible board 21. As illustrated in FIG. 1, the bus bar mount member 32 and the board holder 33 that has almost the same dimension in the front-rear direction as that of the bus bar mount member 32 are configured as a unit 37. Although a whole configuration of the casing 30 is not illustrated, the casing 30 includes the units 37 that are arranged in the front-rear direction and are connected to each other with link members 38. The link members 38 absorb a mounting tolerance between the connection bus bars 13 and the electrode terminals 12.

As illustrated in FIG. 6, the board holder 33 includes a board mount section 34 on which the board body section 22 is placed and a board cover section 35 that covers the board body section 22 from above. The support post 34B projects upward from the board mount section 34. The flexible board 21 is positioned by the support post 34B. The board mount section 34 and the board cover section 35 are connected to each other with a connection section 36 that is a hinge. The board cover section 35 includes a stopper protrusion 35A that is to be fitted to a stopper receiving section 34A of the board mount section 34. Namely, the board body section 22 is arranged between the board mount section 34 and the board cover section 35. The board body section 22 that is covered with the board cover section 35 is suppressed from being exposed to outside and is less likely to receive an external force.

[Connection Portion]

Figure 3:
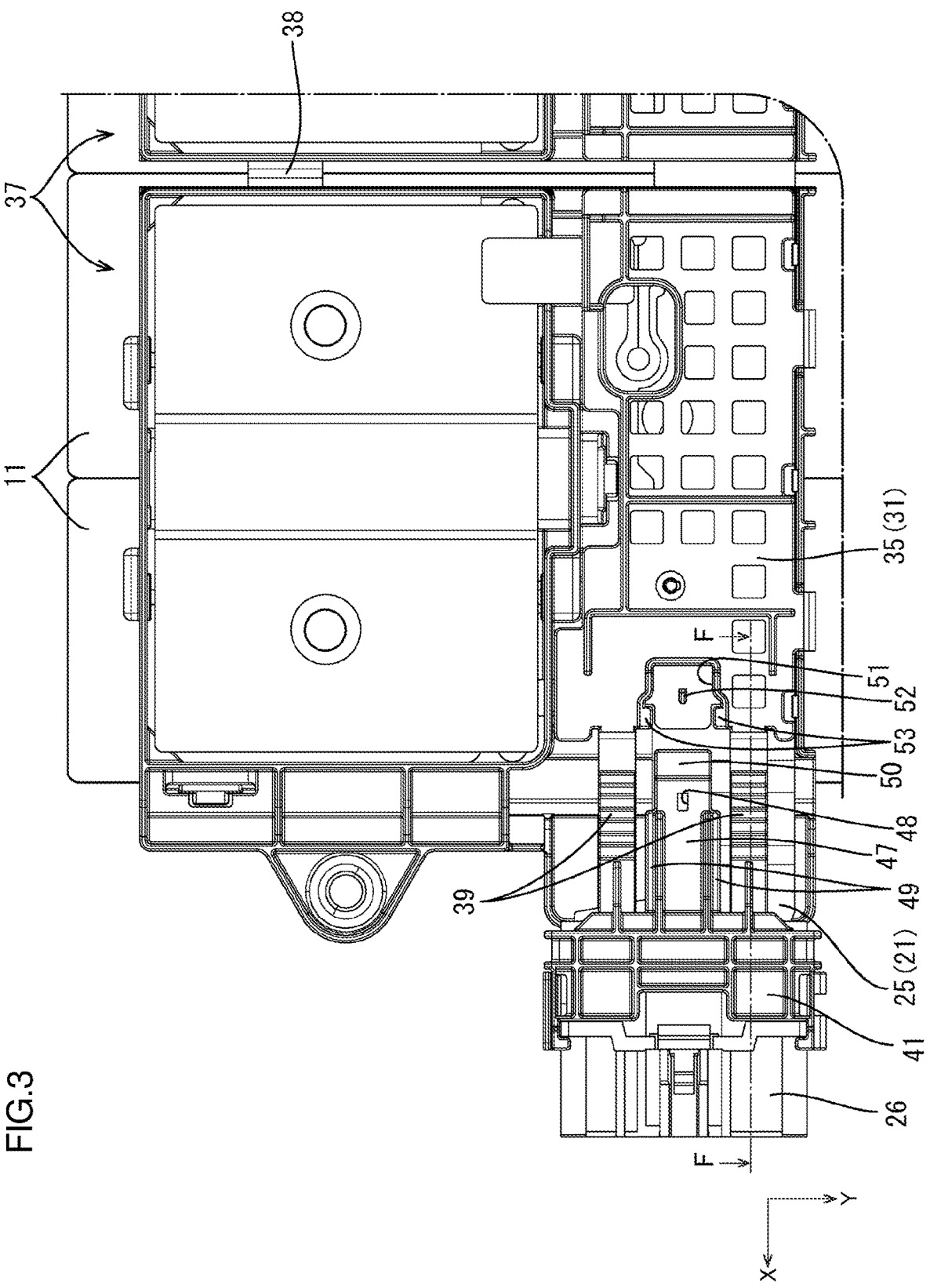
FIG. 3 is an enlarged plan view of the power storage module in which a connection portion is expanded to be longest.
Figure 8:
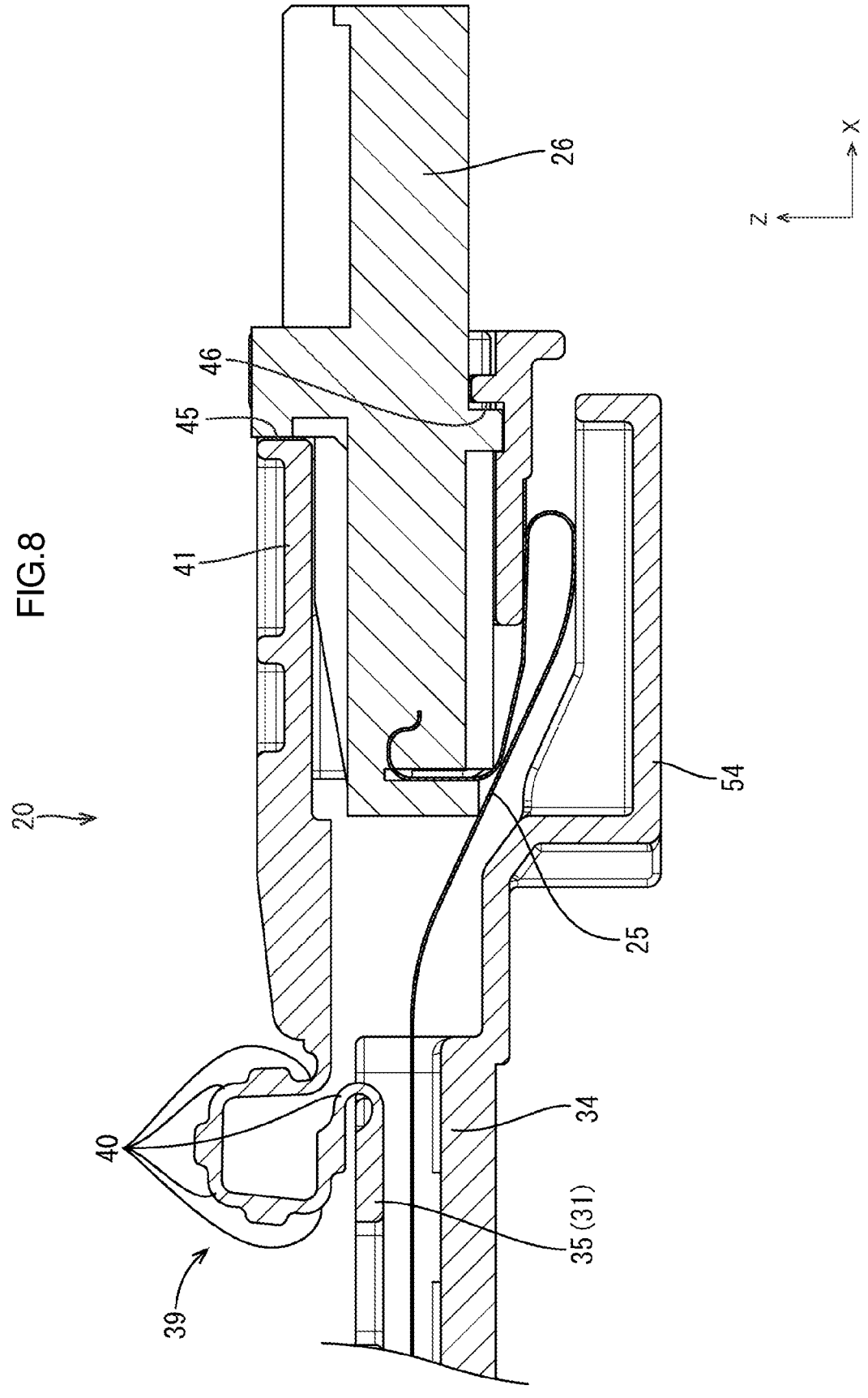
FIG. 8 is a cross-sectional view taken along E-E line in FIG. 2.
Figure 9:
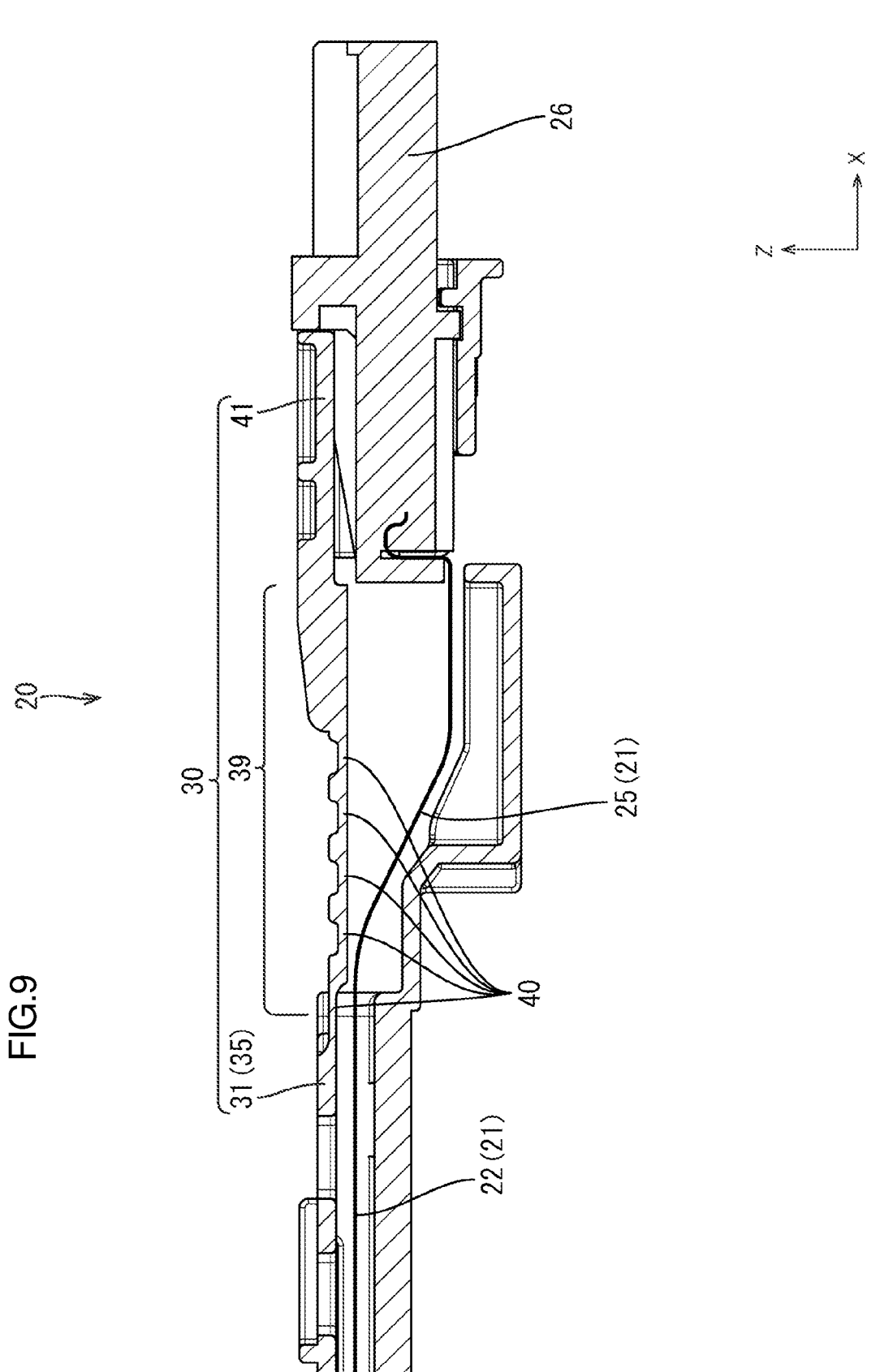
FIG. 9 is a cross-sectional view taken along F-F line in FIG. 3.

As illustrated in FIGS. 2 and 3, one of the units 37 that is at the front end includes two connection portions 39. The connection portions 39 extends from a front end of the board cover section 35. As illustrated in FIGS. 8 and 9, the connection portion 39 includes hinge sections 40. The hinge section 40 is a groove extending in the right-left direction (in a vertical direction relative to a paper surface) and is a thin section so as to be deformable. The connection portion has a caterpillar form and is deformable between a retracted state (refer to FIG. 8) and an expanded state (refer to FIG. 9). The connection portion 39 is expanded in the front-rear direction in FIG. 9; however, the connection portion 39 is also deformable in the top-bottom direction and oblique directions. The connector holder 41 is continuous from an opposite end from the end of the connection portion 39 that is continuous to the board cover section 35.

[Connector Holder]

Figure 4:
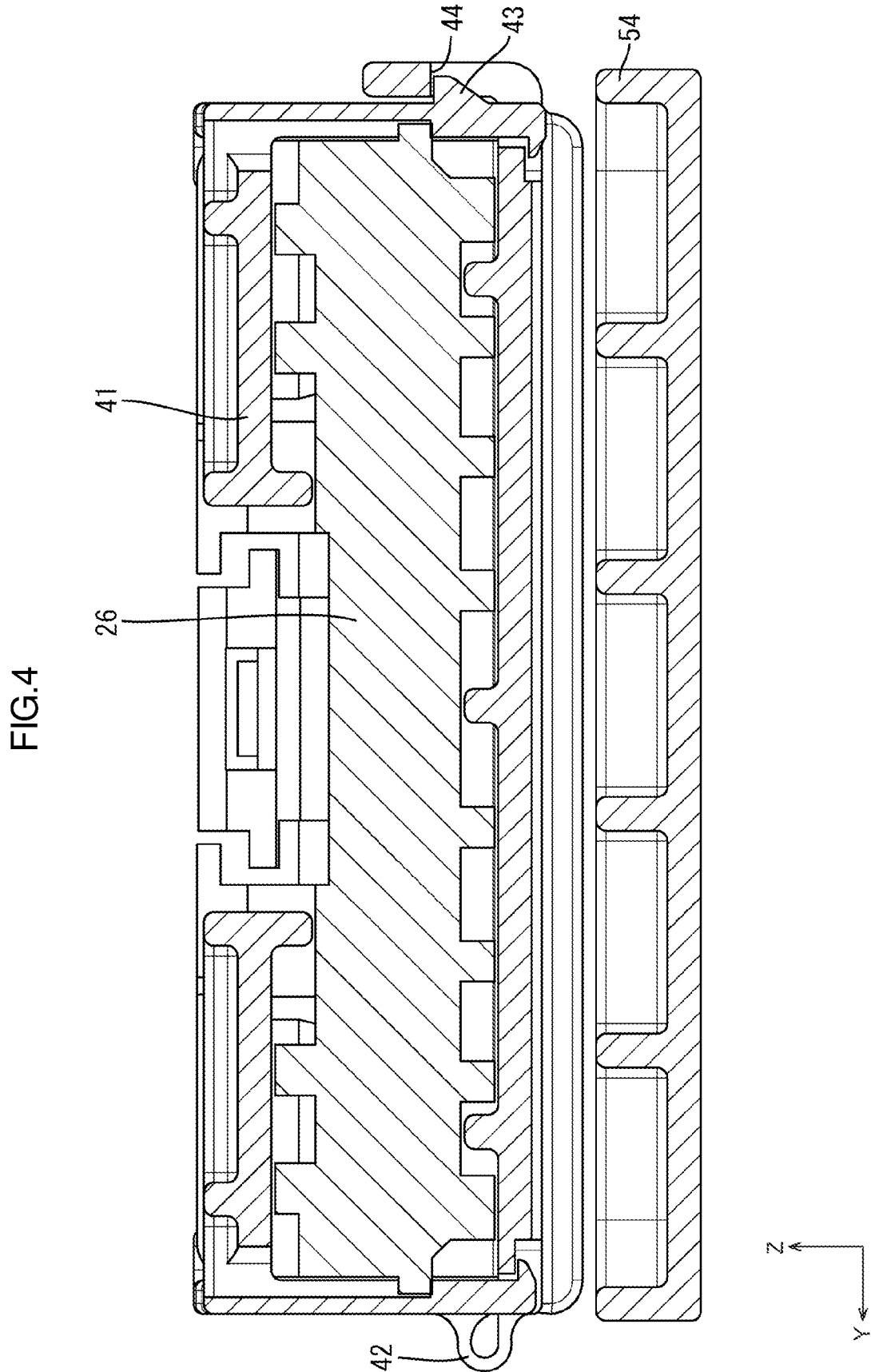
FIG. 4 is a cross-sectional view taken along A-A line in FIG. 2.

As illustrated in FIG. 4, the connector holder 41 holds the connector 26 while covering portions of upper and lower outer surfaces and right and left outer surfaces of the connector 26. Similar to the board holder 33, the connector holder 41 includes a connection section 42, a stopper protrusion 43, and a stopper receiving section 44. The connector holder 41 is fitted to the connector 26 from the upper and lower sides. As illustrated in FIG. 8, the connector holder 41 includes a rear contact portion 45 on an upper wall thereof and a front contact portion 46 on a lower wall thereof. The rear contact portion 45 is contacted with the connector 26 from the rear side and the front contact portion 46 is contacted with the connector 26 from the front side. Since the rear contact portion 45 and the front contact portion 46 are in contact with the connector 26, the connector 26 does not come out of the connector holder 41 in the front-rear direction. The rear end of the upper wall of the connector holder 41 is continuous to the connection portion 39.

As illustrated in FIGS. 8 and 9, since the connector holder 41 is connected to the case body 31 (the board cover section 35) via the connection portion 39, which is expandable and retractable, the connector holder 41 can move freely relative to the case body 31 in the front-rear direction and the top-bottom direction. The connector holder 41 can move relative to the case body 31 in the right-left direction with a smaller range compared to the movement in the front-rear direction and the top-bottom direction. If the connector holder 41 (and the connector 26) moves while the connection portion 39 being expanded or retracted, the extra section 25 that is connected to the connector 26 also moves with following the movement of the connector holder 41.

As illustrated in FIG. 8, the wiring module 20 includes an extra section housing section 54 in front of the board mount section 34 that is at the front end. The extra section 25 is arranged in the extra section housing section and is less likely to be exposed outside. The extra section housing section 54 is recessed downward relative to the board mount section 34. According to such a configuration, the extra section 25 can be arranged in the extra section housing section 54 with being retracted. The connector holder 41 is also arranged in the extra section housing section 54 together with the extra section 25 while the connection portion 39 being retracted. This suppresses the connector 26 from protruding upward and the wiring module 20 is reduced in its height.

In FIG. 3, the connection portion 39 is expanded front-ward to be longest from the case body 31. In this state, the connector 26 cannot move frontward any more. When the connection portion 39 is expanded to be longest, the extra section 25 is loosened as illustrated in FIG. 9. Namely, the extra section 25 is longer than the greatest dimension of the connection portion 39 measured in the front-rear direction. The greatest dimension of the connection portion 39 measured in the front-rear direction is a dimension from the front end of the case body 31 to the rear end surface of the connector 26. In FIG. 9, the connection portion 39 is expanded frontward relative to the case body 31; however, the connection portion 39 may expand upward or rearward. Regardless of an expanding direction of the connection portion 39, the extra section 25 is loosened.

According to such a configuration, a stress is not applied to the extra section 25 even when the connection portion 39 is expanded to be longest. For example, as illustrated in FIG. 10, even if the connector 26 is moved toward the unit-side connector 27 and the connection portion 39 is expanded to be longest to couple the connector 26 and the unit-side connector 27, the extra section 25 is still loosened. There-fore, a load is less likely to be applied to the extra section 25.

[Stopper Receiving Portion, Guide Projection]

As illustrated in FIG. 3, a sliding plate section 47 extends rearward from a rear end of the upper wall of the connector holder 41. The sliding plate section 47 extends from a middle section in the right-left direction of the rear end of the upper wall. The sliding plate section 47 includes a stopper receiving portion 48 in a rear end portion thereof and the stopper receiving portion 48 is a through hole that is through the sliding plate section 47 in the top-bottom direction. The sliding plate section 47 includes guide pro-jections 49 (an example of a guide) that project from right and left edges of the sliding plate section 47, respectively. The guide projections 49 are on the front side relative to the stopper receiving portion 48. As illustrated in FIG. 7, an operation portion 50 is on the rear side of the sliding plate section 47 with having a step between the operation portion 50 and the sliding plate section 47.

[Stopper Portion]

As illustrated in FIG. 3, the board cover section 35 includes a sliding plate arrangement portion 51 in a front end portion thereof. The sliding plate arrangement portion 51 is in a middle section of the board cover section 35 in the right-left direction. The sliding plate section 47 is arranged in the sliding plate arrangement portion 51. As illustrated in FIG. 7, a stopper portion 52 projects upward from a middle section of the sliding plate arrangement portion 51. The stopper portion 52 has a rear surface that is a vertical surface. The stopper portion 52 has a front surface that is a tapered surface and the tapered surface is inclined downward as it extends frontward. The sliding plate section 47 is moved rearward and slid along the sliding plate arrangement por-tion 51 until the stopper portion 52 is fitted to the stopper receiving portion 48. With the stopper portion being fitted to the stopper receiving portion 48, the connector holder 41 (and the connector 26) can be fixed to the case body 31 while the connection portion 39 being loosened. When the stopper portion 52 is fitted to the stopper receiving portion 48, the casing 30 is in a locked state.

[Guide Recess]

Figure 5:
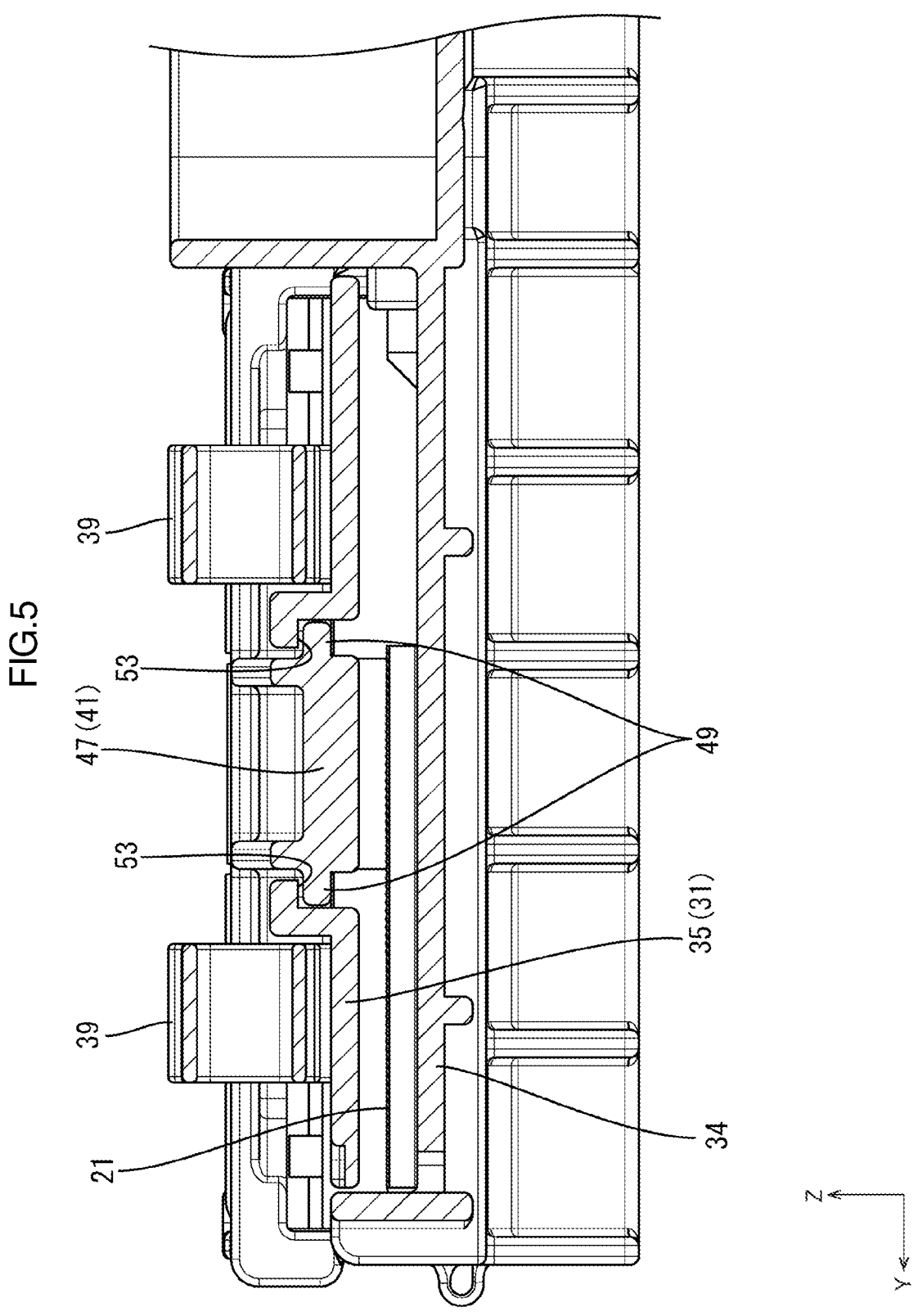
FIG. 5 is a cross-sectional view taken along B-B line in FIG. 2.

As illustrated in FIG. 3, the sliding plate arrangement portion 51 includes guide recesses 53 (one example of the guide) on the right and left edges of the sliding plate arrangement portion 51, respectively. The guide recesses 53 are grooves and on a front section of the sliding plate arrangement portion 51. As illustrated in FIG. 5, in the locked state, the guide projections 49 are contacted with the guide recesses 53, respectively.

As illustrated in FIG. 7, the operation portion 50 is above and away from the board cover section 35. Therefore, in the locked state, the operation portion 50 is pulled upward and frontward to move the sliding plate section 47 frontward. Thus, the locking between the stopper portion 52 and the stopper receiving portion 48 is released. As illustrated in FIG. 5, the guide projections 49 are contacted with the guide recesses 53, respectively, in the locked state. This restricts a movable direction of the connector holder 41 and allows the connector holder 41 to move relative to the case body 31 in the front-rear direction when the sliding plate section 47 slides frontward. Therefore, the locking between the stopper portion 52 and the stopper receiving portion 48 is easily released and the connector 26 is easily connected to the unit-side connector 27 (refer to FIG. 10).

As illustrated in FIG. 3, in this embodiment, the connec-tion portion 39 and the sliding plate section 47 are disposed above the extra section 25. This suppresses the extra section 25 from being exposed outside. The components such as the connection portion 39, the stopper receiving portion 48, the stopper portion 52, the guide projections 49, and the guide recesses 53 are disposed above the flexible board 21. This reduces a size of the wiring module 20 in the right-left direction.

Operations and Advantageous Effects of the Embodiment

According to this embodiment, following operations and advantageous effects are obtained.

The wiring module 20 of this embodiment is to be attached to the power storage elements 11 including the electrode terminals 12. The wiring module 20 includes the flexible board 21 that is to be electrically connected to the electrode terminals 12, the connector 26 that is connected to the flexible board 21, and the casing 30 that holds the flexible board 21 and the connector 26. The casing 30 includes the case body 31 that is to be fixed to the power storage elements 11, the connector holder 41 that holds the connector 26, and the connection portion 39 that can be expanded and retracted and connects the connector holder 41 and the case body 31 such that the connector holder 41 is movable relative to the case body 31. The flexible board 21 includes the board body section 22 that is fixed to the case body 31, and the extra section 25 that extends from the board body section 22 and includes an end connected to the connector 26. The extra section 25 can move with following the expansion and retraction of the connection portion 39. The extra section 25 is always longer than the connection portion 39. The extra section 25 is loosened even if the connection portion 39 is expanded to be longest.

According to the above configuration, the extra section 25 is loosened when the connection portion 39 is expanded to be longest. Therefore, a stress is less likely to be applied to the extra section 25.

In this embodiment, the connection portion 39 includes hinges 40.

According to the above configuration, the connection portion 39 can be expanded and retracted in a smooth manner.

In this embodiment, the connector holder 41 includes the stopper receiving portion 48 with which the connector 26 is fixed relative to the case body 31 and the case body 31 includes the stopper portion 52 that is to be fitted to the stopper receiving portion 48.

According to the above configuration, the connector 26 can be fixed to the case body 31 when the wiring module 20 is transported.

In this embodiment, the casing 30 includes the guide projections 49 and the guide recesses 53 that restrict the direction in which the connector holder 41 moves according to the expansion and retraction of the connection portion 39.

According to the above configuration, the coupling operation of the connector 26 can be performed easily.

In this embodiment, the flexible board 21 and the electrode terminals 12 are electrically connected via the connection bus bar 13 or the output bus bar 14.

According to the above configuration, the flexible board 21 and the electrode terminals 12 are electrically connected easily.

Other Embodiments (1) In the above embodiment, the flexible board 21 is a flexible printed circuit board; however, the flexible board may be a flexible flat cable.

(2) In the above embodiment, the casing 30 includes the guide projections 49 and the guide recesses 53 as the guide; however, the casing may not include a guide.

EXPLANATION OF SYMBOLS

10: Power storage module
11: Power storage element
12: Electrode terminal
13: Connection bus bar
14: Output bus bar
15: Metal plate
20: Wiring module
21: Flexible board
22: Board body section
23: Through hole
24: Board-side connection portion
25: Extra section
26: Connector
27: Unit-side connector
30: Casing
31: Case body
32: Bus bar mount member
33: Board holder
34: Board mount section
34A: Stopper receiving section
34B: Support post
35: Board cover section
35A: Stopper protrusion
36: Connection section
37: Unit
38: Link member
39: Connection portion
40: Hinge
41: Connector holder
42: Connection section
43: Stopper protrusion
44: Stopper receiving section
45: Rear contact portion
46: Front contact portion
47: Sliding plate section
48: Stopper receiving portion
49: Guide projection 50: Operation portion
51: Sliding plate arrangement portion
52: Stopper portion
53: Guide recess
54: Extra section housing section

The invention claimed is:

1. A wiring module to be mounted on power storage elements having electrode terminals, the wiring module comprising:
a flexible board to be electrically connected to the electrode terminals;
a connector connected to the flexible board; and
a casing holding the flexible board and the connector, wherein
the casing includes
a case body to be fixed to the power storage elements,
a connector holder holding the connector, and
a connection portion that is expandable and retractable in a first direction and connects the connector holder and the case body such that the connector holder is movable relative to the case body,
wherein the case body, the connector holder, and the connection portion are monolithic,
wherein the connection portion includes grooves extending in a second direction crossing the first direction and arranged side-by-side in the first direction,
the connection portion includes first portions and second portions,
the first portions having a thickness that is smaller than a thickness of the second portions, and
wherein the first portions and the second portions are arranged alternately in the first direction, thereby forming the grooves, and
the flexible board includes
a board body section fixed to the case body, and
an extra section extending from the board body section and having an end that is connected to the connector, and
the extra section moves according to expansion and retraction of the connection portion and is longer than the connection portion, and the extra section is loosened when the connection portion is expanded to be longest.

2. The wiring module according to claim 1, wherein
the connector holder includes a stopper receiving portion with which the connector is fixed relative to the connector holder, and
the case body includes a stopper portion that is fitted to the stopper receiving portion.

3. The wiring module according to claim 2, wherein the casing includes a guide that restricts a direction in which the connector holder moves according to the expansion and retraction of the connection portion.

4. The wiring module according to claim 3, wherein, the flexible board and the electrode terminals are electrically connected via a bus bar.

5. The wiring module according to claim 2, wherein, the flexible board and the electrode terminals are electrically connected via a bus bar.

6. The wiring module according to claim 1, wherein the casing includes a guide that restricts a direction in which the connector holder moves according to the expansion and retraction of the connection portion.

7. The wiring module according to claim 6, wherein the flexible board and the electrode terminals are electrically connected via a bus bar.

8. The wiring module according to claim 1, wherein, the flexible board and the electrode terminals are electrically connected via a bus bar.

9. The wiring module according to claim 1, wherein the grooves have a length extending in the second direction and the length of the grooves is the same as a width of the connection portion extending in the second direction.

10. A wiring module to be mounted on power storage elements having electrode terminals, the wiring module comprising:

a flexible board to be electrically connected to the electrode terminals;

a connector connected to the flexible board; and a casing holding the flexible board and the connector, wherein the casing includes a case body to be fixed to the power storage elements, a connector holder holding the connector, and a connection portion that is expandable and retractable and connects the connector holder and the case body such that the connector holder is movable relative to the case body, wherein the connection portion includes a first end portion that is connected to the connector holder and a second end portion that is connected to the case body, the connection portion is configured to bend such that the first end portion and the second end portion are closer to each other in a retracted state than in an expanded state, and wherein the connection portion has a ring shape in the retracted state, and the flexible board includes a board body section fixed to the case body, and an extra section extending from the board body section and having an end that is connected to the connector, and the extra section moves according to expansion and retraction of the connection portion and is longer than the connection portion, and the extra section is loosened when the connection portion is expanded to be longest.

11. The wiring module according to claim 10, wherein the connector holder, the case body, and the connection portion are monolithic.

12. The wiring module according to claim 10, wherein the grooves have a length extending in the second direction and the length of the grooves is the same as a width of the connection portion extending in the second direction.

13. The wiring module according to claim 10, wherein the connector holder includes a stopper receiving portion with which the connector is fixed relative to the connector holder, and the case body includes a stopper portion that is fitted to the stopper receiving portion.

14. The wiring module according to claim 13, wherein the casing includes a guide that restricts a direction in which the connector holder moves according to the expansion and retraction of the connection portion.

15. The wiring module according to claim 14, wherein, the flexible board and the electrode terminals are electrically connected via a bus bar.

16. The wiring module according to claim 13, wherein, the flexible board and the electrode terminals are electrically connected via a bus bar.

17. The wiring module according to claim 10, wherein the casing includes a guide that restricts a direction in which the connector holder moves according to the expansion and retraction of the connection portion.

18. The wiring module according to claim 17, wherein, the flexible board and the electrode terminals are electrically connected via a bus bar.

19. The wiring module according to claim 10, wherein, the flexible board and the electrode terminals are electrically connected via a bus bar.

* * * * *